(12) United States Patent
Correia et al.

(10) Patent No.: US 10,640,178 B2
(45) Date of Patent: May 5, 2020

(54) ROTATING FLOATING PLATFORM

(71) Applicant: SOLARISFLOAT, LDA, Matosinhos (PT)

(72) Inventors: Nuno Correia, Oporto (PT); Carla Gomes, Oporto (PT); Ricardo Pinto, Oporto (PT); Luis Pina, Oporto (PT); Nuno Moita, Oporto (PT); Jorge Teixeira Da Silva, Oporto (PT)

(73) Assignee: SOLARISFLOAT, LDA, Matosinhos (PT)

( * ) Notice: Subject to any disclaimer, the term of this patent is extended or adjusted under 35 U.S.C. 154(b) by 0 days.

(21) Appl. No.: 16/324,358

(22) PCT Filed: Sep. 25, 2017

(86) PCT No.: PCT/IB2017/055799
§ 371 (c)(1),
(2) Date: Feb. 8, 2019

(87) PCT Pub. No.: WO2018/055585
PCT Pub. Date: Mar. 29, 2018

(65) Prior Publication Data
US 2019/0168847 A1 Jun. 6, 2019

(30) Foreign Application Priority Data
Sep. 26, 2016 (PT) .......................................... 109637

(51) Int. Cl.
*B63B 35/38* (2006.01)
*F24S 20/70* (2018.01)
(Continued)

(52) U.S. Cl.
CPC .............. *B63B 35/38* (2013.01); *B63B 35/34* (2013.01); *F24S 20/70* (2018.05); *F24S 30/40* (2018.05); *H02S 20/00* (2013.01); *B63B 21/00* (2013.01)

(58) Field of Classification Search
CPC ................................ B63B 35/38; B63B 21/00
See application file for complete search history.

(56) References Cited

U.S. PATENT DOCUMENTS 4,786,795 A * 11/1988 Kurashima ........... G01S 3/7861
250/203.4
2019/0168847 A1* 6/2019 Correia ................... B63B 35/38

FOREIGN PATENT DOCUMENTS

FR 2928899 A1 9/2009
FR 2988164 A1 * 9/2013 ............. H02S 20/00
(Continued)

OTHER PUBLICATIONS

International Search Report and Written Opinion dated Jan. 4, 2018 for PCT/IB2017/055799.

*Primary Examiner* — S. Joseph Morano
*Assistant Examiner* — Jovon E Hayes
(74) *Attorney, Agent, or Firm* — Lucas & Mercanti, LLP

(57) ABSTRACT

A rotating floating platform, adapted to accommodate energy production systems, namely solar panels but not limited to these systems. The technology now developed provides rotational movement to the entire platform, on the plane of the aquatic medium where it floats, being its rotation capacity independent of fixed and rigid structures. In order to achieve this independency, the rotating floating platform comprises a central floating module connected directly or indirectly to at least two propulsion modules, where the connection to the bottom of the basin being provided through a flexible mooring unit forming a rotation (Continued)

floating structure where the momentum and the rotation axis act as one, thus creating a rotation platform.

8 Claims, 4 Drawing Sheets

(51) Int. Cl.
*H02S 20/00* (2014.01)
*B63B 35/34* (2006.01)
*F24S 30/40* (2018.01)
*B63B 21/00* (2006.01)

(56) References Cited

FOREIGN PATENT DOCUMENTS

| | | | | |
|---|---|---|---|---|
| FR | 2988164 A1 | 9/2013 | | |
| WO | 2008115068 A1 | 9/2008 | | |
| WO | WO-2008115068 A1 * | 9/2008 | ......... | B63B 35/4413 |
| WO | 2012131543 A1 | 10/2012 | | |
| WO | WO-2012131543 A1 * | 10/2012 | ............. | H02S 40/22 |

* cited by examiner

US 10,640,178 B2

ROTATING FLOATING PLATFORM

CROSS-REFERENCE TO RELATED APPLICATIONS

This application is a 371 of PCT/IB2017/055799 filed Sep. 25, 2017, which claims the benefit of Portuguese Patent Application No. 109637, filed Sep. 26, 2016, both applications are incorporated herein by reference.

TECHNICAL FIELD

The present application describes a rotating floating platform.

BACKGROUND ART

Current energy production centrals based on photovoltaic cells, ranging different scales, are installed either on ground (onshore) or on pre-existing structures. These systems are rarely installed in water surfaces such as lakes, lagoons, ponds, dam reservoirs, rivers, among others.

The document WO 2012/131543 describes a solar panel floating structure which is made up of a floating platform rotating about its vertical axis by means of a rail system, anchored to the bottom of the hydrographic basin and its margin. The rotation movement of the structure is limited to pre-defined positions and held in place by fixation means of the rotating platform in reference to the fixed structure.

The document FR 2988164 describes a system where a rigid structure designed to accommodate solar panels revolves around a central axis by means of floating components traveling within a well-defined path.

The document U.S. Pat. No. 4,786,795 describes a platform that is designed only to track the solar movement, by using a plurality of solar tracking subsystems which provide information for the control system to activate the motors which can work forwards or backwards, rotating the platform about a fixed structure. The structure's weight is supported by the fixed structure, which is fixed to the bottom of the basin. The platform can also be floating without being fixed to a central structure by means of a cable and pulley system that is fixed to the bottom of the basin and is connected to the platform on its extremities.

SUMMARY

The present application describes a rotating floating platform comprising a:
  Central floating module;
  A plurality of propulsion modules;
  Wherein the central floating module is characterized by comprising a central floating component provided with a bearing type connection for coupling an outer component, and means for fixating a mooring unit of an anchor type; said outer component providing the connection of the plurality of propulsion modules by means of a fixation mechanism.

In one embodiment of the rotating floating platform the outer component is of a ring shape.

In another embodiment of the rotating floating platform the propulsion module comprises a motor unit coupled to at least one floating component.

In another embodiment of the rotating floating platform the motor unit comprises a communication module configured to establish a wired/wireless communication link to an external entity.

In another embodiment of the rotating floating platform the motor unit comprises an engine operated by a control unit, said control unit having processor means configured to operate the respective motor according to instructions received by the external entity.

In another embodiment of the rotating floating platform the mooring unit is fixed to the central floating module by means of a swivel and rope connection providing the connection of the platform to the bottom of the basin.

In another embodiment of the rotating floating platform, it comprises at least one floating component connected between the outer component of the central floating module and the propulsion module, by means of the fixation mechanism.

In another embodiment of the rotating floating platform the fixation mechanism is of a rope type.

GENERAL DESCRIPTION

The technology now developed describes a rotating floating platform, providing rotational movement to the entire structure, on the plane of the aquatic medium where it floats.

The system herein described is designed, but no limited to, floating platforms adapted to accommodate energy production systems, namely solar panels but not limited to these systems.

The main innovation in the present application is the ability to deploy the rotating floating platform in any aquatic medium, being its rotation capacity independent of fixed and rigid structures. In order to achieve this independency, the rotating floating platform comprises a central floating module connected directly or indirectly to a plurality of propulsion modules, where the connection to the bottom of the basin being provided through a flexible mooring unit, forming a rotation floating structure where the momentum and the rotation axis act as one, thus creating a rotation platform.

The central floating module comprises a central floating component and an outer component that can rotate independently from the central floating component by means of a bearing type connection, thus granting rotational freedom of said outer component.

The platform is assembled by attaching any other floating components to the outer component by using a fixation mechanism like a rope, therefore granting the platform a freedom to rotate around the central floating component. The central floating component is a buoy with means for fixating both the outer component and the mooring unit.

The rotating floating platform is free from fixed structures, and comprises a mooring unit of an anchor type, fixed to the central module by means of a swivel and rope connection, thus connecting it to the bottom of the basin. In the context of this application, anchor type connection should be understood as a flexible connection type made of a flexible connection element such as a rope, having in one of its extremities an anchor mechanism to provide the mooring of the entire platform. This approach has the advantage of not limiting the planar movement of the platform along the water plane.

The propulsion module comprises a motor unit, which is coupled to at least one floating component. Said motor unit comprises an engine operated by a control unit having processor means configured to operate the respective motor, and therefore defining the rotational movement direction of the propeller attached to it, according to instructions received by external entities responsible for controlling the rotational movement of the platform. For that purpose, the control unit also comprises a communication module configured to establish wired/wireless communication links to said external entities. The connection between the control unit and the motor is provided by a vertical stick, which holds the motor in a pre-defined distance between the bottom surface of the platform and the ground.

The motor unit comprises additionally a fixation mechanism to attach the referred unit to the floating component. The fixation mechanism comprises a rigidly mechanical tubular frame that is attached to the floating structure, namely, to two floating components, by means of a connection mechanism. Said connection mechanism could be of a clamp and screw type. The motor is coupled to the fixation mechanism by a plate, serving as a spacer, using a screw type connection.

By combining both these sub systems, we can create a floating platform that revolves freely around an axis, created by the central module, driven by the momentum generated by the propulsion modules, creating a floating platform with rotational ability. For the sake of this solution, the propulsion modules are mounted on the extremities of the floating platform, thus maximizing the moment of the movement.

BRIEF DESCRIPTION OF DRAWINGS

For easier understanding of this application, figures are attached in the annex that represent the preferred forms of implementation which nevertheless are not intended to limit the technique disclosed herein.

DESCRIPTION OF EMBODIMENTS

Figure 1:
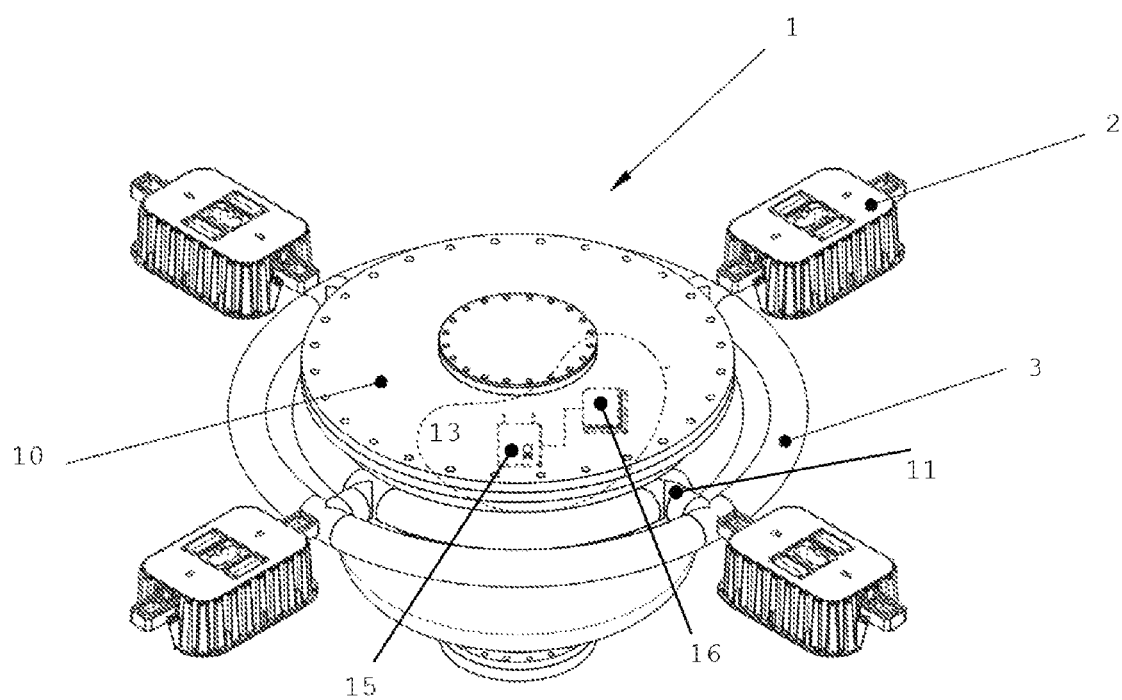
FIG. 1: Schematic representation of the central floating module (1), where the reference numbers represent:
2—Floating Component;
3—Outer component;
10—Central Floating Component;
11—Bearing connection;
13—Control unit;
15—Communication module;
16—Processor.
Figure 2:
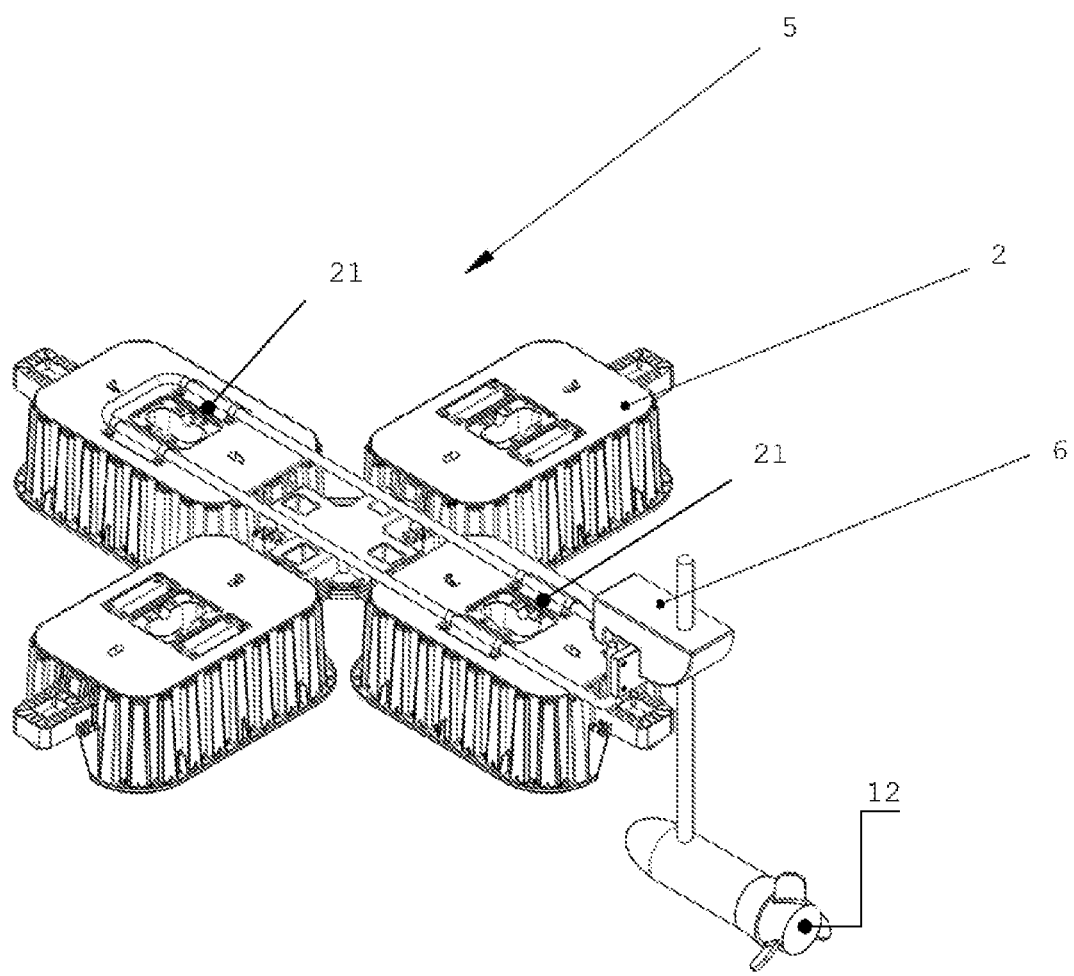
FIG. 2: Schematic representation of the propulsion module (5), where the reference numbers represent:
2—Floating Component;
6—Motor Unit;
12—Propeller;
21—Connection mechanism.
Figure 3:
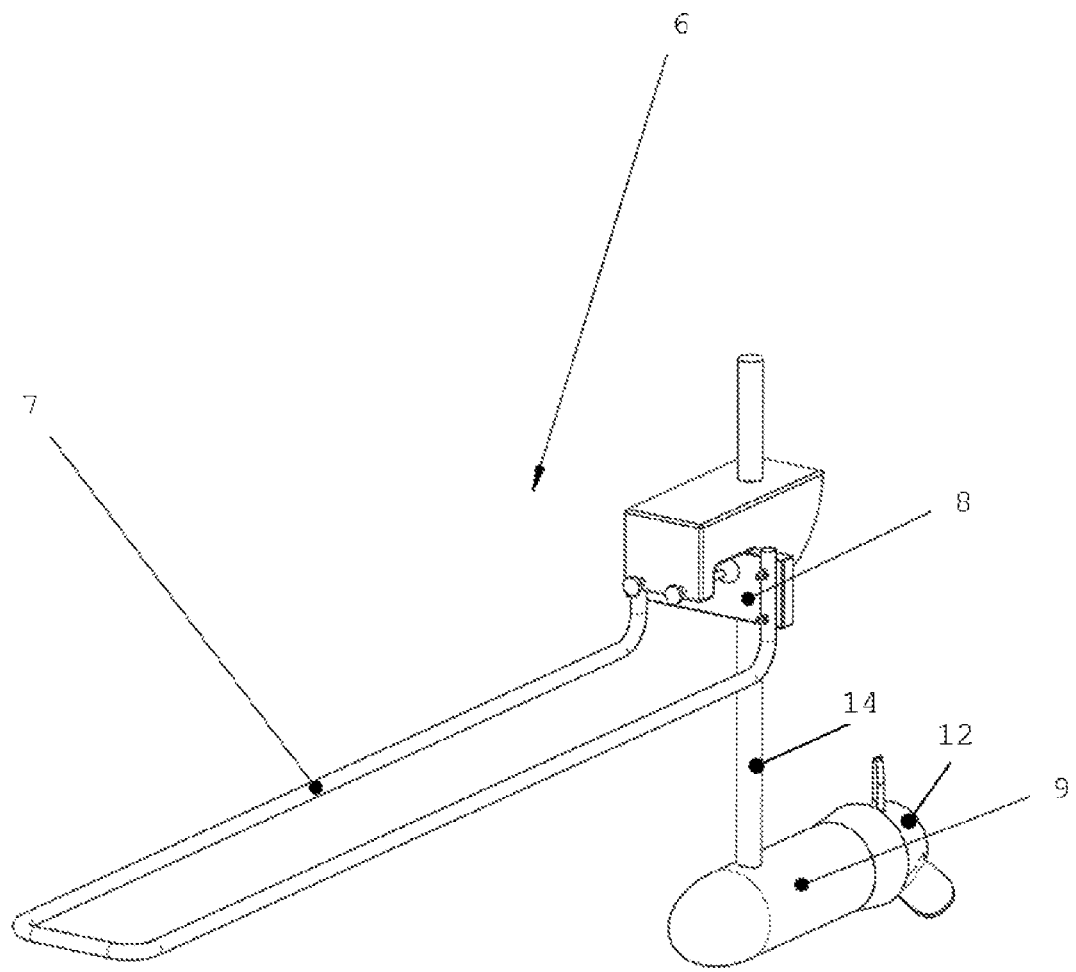
FIG. 3: Schematic representation of the motor unit (6), where the reference numbers represent:
7—Tubular Frame;
8—Wooden Plate;
9—Engine;
12—Propeller;
14—Vertical stick.
Figure 4:
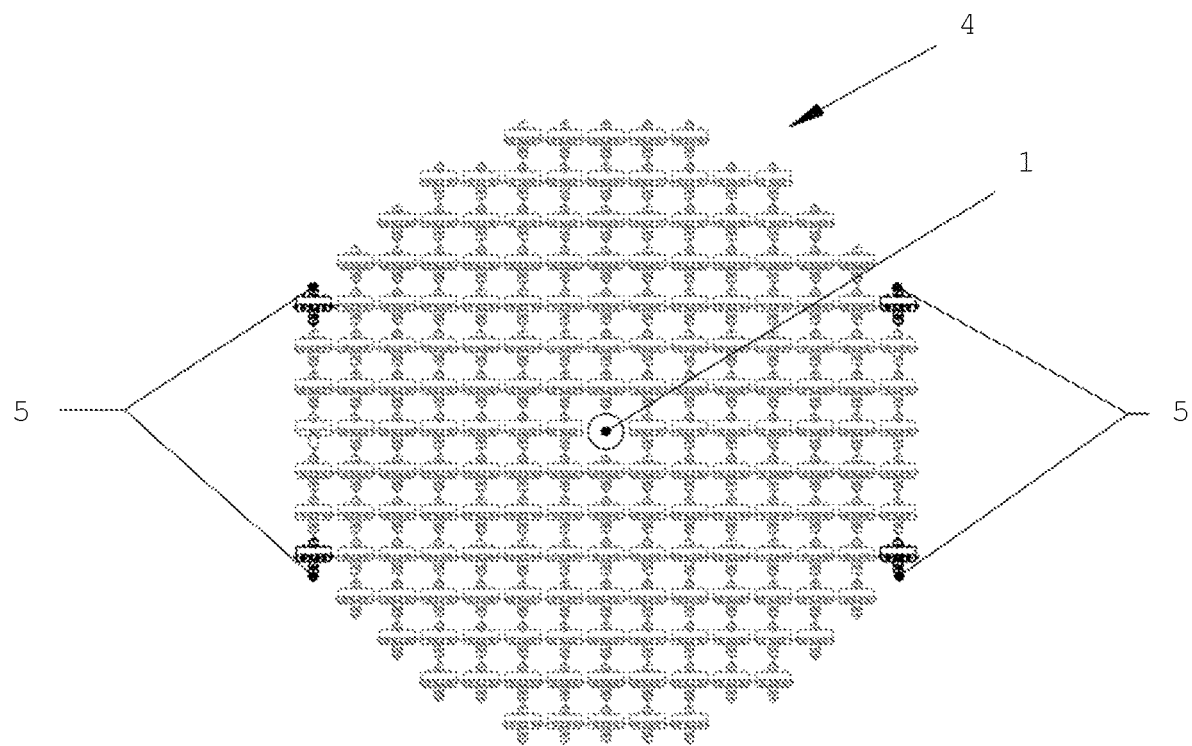
FIG. 4: Schematic representation of a particular embodiment of the modular floating platform (4) with propulsion modules installed (5) around the central module (1).

For easier understanding of this application, figures are attached in the annex that represent example forms of implementation which, nevertheless, are not intended to limit the technique disclosed herein.

In a particular embodiment, the central module (1) is of a circular shape and has four floating components (2). Said floating components (2) are connected to its central floating module (10) through a rotating outer component (3) of a ring shape (3), by means of a mechanical connection, for example a cable type. Said floating components (2) are in turn connected to three more floating components (2), forming each one a floating platform (4), which is connected to the central module (1). By connecting more floating platforms (4) to this central structure it is possible to create a modular floating platform. To ensure the rotational movement of the entire structure, propulsion modules (5) are attached to floating platforms (4) at pre-defined locations, specifically on the extremities of the modular floating platform. The propulsion module (5) is assembled by mounting the motor unit (6) over floating components (2) by means of a screw type connection. The motor unit (6) itself has the means for connecting the frame (7) to the wooden plate (8) and to the motor (9). In that way, the rotational movement of the entire structure is independent of fixed and rigid structures.

Although the preferred embodiments of the present application have been disclosed for illustrative purposes, those skilled in the art will appreciate that various modifications, additions and substitutions are possible, without departing from the scope of the application. Therefore, the present application is not limited to the above-described embodiments, being defined by the claims which follow, along with their fall scope of equivalents.

The invention claimed is:

1. A rotating floating platform comprising:
a central floating module comprising
a central floating component having a bearing for coupling an outer component;
a plurality of propulsion modules, coupled to the central floating component, wherein each of said plurality of propulsion modules comprises at least one floating component and a motor unit coupled to said at least one floating component, the motor unit comprising an engine and a propeller; and
a control unit comprising a processor and a communication module, wherein the communication module is configured to establish a wired/wireless communication link to an external entity, and the processor is configured to operate the engine and the propeller of the motor unit of each of said plurality of propulsion modules by defining a rotation movement according to instructions received by the external entity.

2. The rotating floating platform according to claim 1, wherein the outer component is of a ring shape.

3. The rotating floating platform according to claim 1, wherein the central floating module further comprises a mooring unit fixed to the central floating component by means of a swivel and rope connection providing the connection of the floating platform to the bottom of the basin.

4. The rotating floating platform according to claim 1, wherein the central floating module further comprises at least one floating component connected between the outer component of the central floating module and the propulsion module, by means of a fixation mechanism.

5. The rotating floating platform according to claim 4, wherein the fixation mechanism comprises rope.

6. The rotating floating platform according to claim 1, wherein the motor unit of a propulsion module is coupled to two floating components by a rigidly mechanical tubular frame and by means of a connection mechanism.

7. The rotating floating platform according to claim 6, wherein the connection mechanism comprises clamps and screws.

8. The rotating floating platform according to claim 6, wherein the connection between the rigidly mechanical tubular frame and the engine is provided with a vertical stick and a wooden plate, which holds the engine in a pre-defined distance between a bottom surface of the platform and the ground.

\* \* \* \* \*